(12) United States Patent
Nakamura et al.

(10) Patent No.: US 7,704,436 B2
(45) Date of Patent: Apr. 27, 2010

(54) COSMETIC APPLICATOR AND ITS PRODUCTION METHOD

(75) Inventors: Kenji Nakamura, 3-41, Nishiawaji 6-chome, Higashi Yodogawa-ku, Osaka-shi, Osaka (JP); Koji Nakamura, 341, Nishiawaji 6-chome, Higashi Yodogawa-ku, Osaka-shi, Osaka (JP)

(73) Assignees: Kenji Nakamura, Osaka (JP); Koji Nakamura, Osaka (JP)

( * ) Notice: Subject to any disclaimer, the term of this patent is extended or adjusted under 35 U.S.C. 154(b) by 0 days.

(21) Appl. No.: 11/035,314

(22) Filed: Jan. 13, 2005

(65) Prior Publication Data

US 2005/0159499 A1 Jul. 21, 2005

(30) Foreign Application Priority Data

Jan. 15, 2004 (JP) ............... 2004-007755

(51) Int. Cl.
*B29C 39/00* (2006.01)
*B29C 67/24* (2006.01)
*B29C 44/34* (2006.01)
*B28B 11/14* (2006.01)

(52) U.S. Cl. .................. 264/414; 264/413; 264/417; 264/420; 264/425; 264/489; 264/496; 264/50; 264/145; 264/152; 264/213; 264/216; 264/236; 264/297.5; 264/347; 521/50.5; 521/65; 521/92

(58) Field of Classification Search .................. None
See application file for complete search history.

(56) References Cited

U.S. PATENT DOCUMENTS

| | | | | | |
|---|---|---|---|---|---|
| 2,809,172 | A | * | 10/1957 | Keen | ............... 521/65 |
| 3,076,226 | A | * | 2/1963 | Borton et al. | ............... 425/101 |
| 3,081,496 | A | * | 3/1963 | Moore | ............... 264/415 |
| 3,737,488 | A | * | 6/1973 | Porter et al. | ............... 264/418 |
| 4,418,106 | A | * | 11/1983 | Landler et al. | ............... 428/89 |
| 4,798,644 | A | * | 1/1989 | Scott et al. | ............... 156/324 |
| 4,945,015 | A | * | 7/1990 | Milner et al. | ............... 523/179 |
| 5,096,641 | A | * | 3/1992 | Popke | ............... 264/50 |
| 5,332,621 | A | * | 7/1994 | Schmidt et al. | ............... 428/318.4 |
| 6,346,557 | B1 | * | 2/2002 | Argy et al. | ............... 521/71 |

FOREIGN PATENT DOCUMENTS

| | | |
|---|---|---|
| JP | 57-091252 | 6/1982 |
| JP | 57-113048 | 7/1982 |
| JP | 59-40021 | 3/1984 |
| JP | 06-030816 | 2/1994 |
| JP | 06-209821 | 8/1994 |
| JP | 08-108434 | 4/1996 |
| JP | 08-266329 | 10/1996 |
| JP | 2004-250640 | 9/2004 |

* cited by examiner

*Primary Examiner*—Jeffrey Wollschlager
(74) *Attorney, Agent, or Firm*—Knobbe Martens Olson & Bear, LLP

(57) ABSTRACT

A cosmetic applicator is made of a rubber latex foam which has been solidified by microwave irradiation. The foam satisfies (i) a bubble fineness corresponding to 9 bubbles/mm$^2$ or more, (ii) flexibility of 0.7 N/cm$^2$ or less in initial Young's modulus indicated by 50% compressive stress, and (iii) bulk density of 0.14 g/cm$^3$ or less.

14 Claims, No Drawings

COSMETIC APPLICATOR AND ITS PRODUCTION METHOD

BACKGROUND OF THE INVENTION

1. Field of the Invention

This invention relates to a cosmetic applicator offering excellent utility as well as superior absorbency and barrier property with respect to cosmetic materials.

The present invention relates to a cosmetic applicator made of a rubber latex foam that exhibits bubble fineness, flexibility and bulk density of specified ranges.

To be more specific, the present invention relates to a cosmetic applicator made of a foam that simultaneously satisfies the three requirements of a bubble fineness corresponding to 9 bubbles/mm$^2$ or more, flexibility of 0.7 N/cm$^2$ or less in initial Young's modulus indicated by 50% compressive stress, and bulk density of 0.14 g/cm$^3$ or less, wherein such foam is produced by way of outputting a stock solution for rubber latex foam production to a specified thickness and then irradiating microwaves to quickly solidify and vulcanize the solution.

The present invention also relates to a production method of the aforementioned cosmetic applicator.

2. Description of the Related Art

The foaming method (Dunlop method) and refrigerated solidification method (Talalay method) have been known as representative methods for producing rubber foam from rubber latex. Since the Talalay method cannot provide a flexible, fine, uniform foam, the Dunlop method is commonly adopted. In the Dunlop method, normally sodium silicofluoride is added to a latex compound solution and the mixture is agitated at high speed while blowing in air to produce a stock solution for latex foam production. This stock solution is then output into a liner having mold release property to a specified thickness, and then let stand in raised or room temperature until the solution solidifies by gelling and acquires a shale-retaining property.

In other words, since rubber latex is stable when it has an alkaline property, sodium silicofluoride is added to destabilize the rubber latex property via decomposition of sodium silicofluoride, thereby gradually changing the rubber latex property to acidity. This acid rubber latex is then gelated and solidified. However, the condition of this solidification process through gelling (solidification condition) has been the cause of repeated trials and errors in order to find optimal rubber latex formulations and molding conditions that yield higher productivity and consistent quality of foamed products. Today, the bubbled stock solution for latex foam production is generally solidified in room or raised temperature within 80 to 210 seconds after the solution is output.

In the present invention, "solidification" refers to solidification through gelling.

In the Dunlop method, the bubbles formed by way of injecting sodium silicofluoride and blowing in air cause the surface tension of the liquid in which the bubbles are formed to change when gelling is started, and once the bubbles start collapsing the bubbles will grow in size. The gelling point is generally set to 29±2° C., with a wait time of 80 to 200 seconds. This time must be ensured in the production process. Only after this time elapses will solidification progress with the initiation of gelling.

Flexibility of a foam is obtained by lowering its density. However, since the bubble wall becomes thinner as the density decreases, a lower density will cause fine bubbles to collapse during gelling and allow the bubbles to grow larger in size. For this reason, it was difficult to obtain fine bubbles at low density.

Based on the conventional Dunlop method described above, it was therefore unfeasible to obtain a foam satisfying the three requirements of fine bubble structure, flexibility and low density—the structural properties of foam desired by cosmetic applicators.

As a way to provide a flexible, low-density bubble layer, Japanese Patent Application Laid-open No. 6-30816 proposes use of a rubber latex stock solution that solidifies quickly. This technology is to adjust the pH of the rubber latex compound solution to between 11.7 and 12.00 and agitate the solution as sodium silicofluoride and air are blown in to produce a quick-solidifying stock solution for latex foam production. However, although the resulting solution can be applied on the surface of a seat material, as a solution for foam production the formulation does not provide a uniformly molded product. This is because solidification progresses when the solution is poured into a mold, thereby preventing formation of a uniform foam.

On the other hand, methods that utilize microwaves for sponge are also known. Examples include the method to improve the smoothness of sponge rubber surface by heating the surface with microwaves (Japanese Patent Application Laid-open No. 57-113048), and the method to adjust the sponge size by applying microwaves and hot air to an unvulcanized material (Japanese Patent Application Laid-open No. 8-108434). However, these methods do not utilize microwaves for the purpose of solidification.

Japanese Patent Application Laid-open No. 57-91252 proposes a foam production method that uses microwaves. Under this method, a stock solution for latex foam production is output onto a conveyor, with the sides heated by a hot-air blower and the top heated by a far-infrared or high-frequency electromagnetic heater. This method has been reported to reduce the losses resulting from the need to remove soiled or deformed sections on sides. Although it eliminates the side trimming process, this method does not use microwave irradiation during solidification.

On the other hand, another method is known whereby a relatively thick foam sheet is sliced into thin sheets and then stacked and joined together with the molded surface membrane with crushed bubbles facing the top membrane, thereby producing a cosmetic applicator (Japanese Utility Model Application Laid-open No. 59-40021). However, this method does not improve the bubble structure, flexibility or bulk density of the foam itself.

SUMMARY OF THE INVENTION

As explained above, the conventional foam production technologies using rubber latex as the material do not produce a latex foam desired by cosmetic applicators, i.e., a low-density, flexible foam having a fine bubble structure characterized by a uniform distribution of small bubbles.

Even cosmetic applicators of the highest possible production quality had only 5 to 6 bubbles/mm$^2$, flexibility of 1.5 to 1.6 N/cm$^2$ in initial Young's modulus indicated by 50% compressive stress, and bulk density of 0.16 to 0.18 g/cm$^3$. No cosmetic applicators were available that were made of a foam offering excellent flexibility and low density, even when the fineness of bubbles could be improved to over the aforementioned levels.

The present invention was developed for the purpose of providing a cosmetic applicator offering a fine bubble structure, low density and flexibility—the properties most desired by cosmetic applicators. In particular, the present invention aims to provide a cosmetic applicator made of a foam that simultaneously satisfies the three requirements of a bubble fineness corresponding to 9 bubbles/mm$^2$ or more, flexibility of 0.7 N/cm$^2$ or less in initial Young's modulus indicated by 50% compressive stress, and bulk density of 0.14 g/cm$^3$ or less. The bubble fineness is preferably 9 to 13 bubbles/mm. The flexibility in initial Young's modulus indicated by 50% compressive stress is preferably 0.3 to 0.7 N/cm$^2$. The bulk density is preferably 0.10 to 0.14 g/cm$^3$.

As described above, under the Dunlop method, solidification already starts when the stock solution is output if the solution is formulated in such a way that solidification will start quickly (quick solidification). Since this prevents the solution from being poured uniformly into the mold, the resulting foam will have a non-uniform and uneven property. Even if the density can be kept low, such foam will not provide sufficient body. On the other hand, if the stock solution is formulated in such a way that solidification will start slowly (to provide a sufficient time before solidification starts), the bubble wall will become thicker and bubbles will grow in size, and the density will also increase. As a result, a quality foam suitable for cosmetic applicators cannot be obtained.

Because of the above reasons, when the Dunlop method is used the time before the start of solidification of the stock solution for latex foam production, which is obtained by injecting air and sodium silicofluoride into a rubber latex compound solution, must be adjusted to around 80 to 210 seconds, or preferably 90 to 180 seconds, after the stock solution is output into the mold.

Since bubble formation undergoes many changes after the stock solution for latex foam production is output into a liner having mold release property or mold and before it solidifies, even if fine bubbles can be formed via high-speed agitation of the stock solution by way of operating the agitation implement as fast as possible, the fine bubble structure will not remain fixed throughout the solidification process.

Instead, bubbles continue to change until solidification is completed. In general, the thinner the bubble wall, the lower the foam density becomes. Since a low density increases the chances of bubbles breaking, the resulting foam will have bubbles of varying sizes.

In view of the above, the present invention aims to provide a molded foam offering the levels of "bulk density," "fineness of bubbles" and "flexibility" most suitable for producing cosmetic applicators. To do this, the present invention focused on the process of bubble wall formation through solidification of the rubber latex stock solution for foaming.

The present invention basically involves the following components:

(1) A cosmetic applicator made of a rubber latex foam that has been solidified by microwave irradiation, wherein such foam simultaneously satisfies the three requirements of a bubble fineness corresponding to 9 bubbles/mm$^2$ or more, flexibility of 0.7 N/cm$^2$ or less in initial Young's modulus indicated by 50% compressive stress, and bulk density of 0.14 g/cm$^3$ or less.

(2) A cosmetic applicator as described in (1), wherein at least two sliced foam sheets are stacked and joined together.

(3) A method for producing a cosmetic applicator from a foam that simultaneously satisfies the three requirements of a bubble fineness corresponding to 9 bubbles/mm$^2$ or more, flexibility of 0.7 N/cm$^2$ or less in initial Young's modulus indicated by 50% compressive stress, and bulk density of 0.14 g/cm$^3$ or less, by way of injecting sodium silicofluoride and air into rubber latex and agitating the mixture at high speed to produce a stock solution for latex foam production, and then outputting the solution into a mold and irradiating microwaves to quickly solidify and vulcanize the solution.

The cosmetic applicator proposed by the present invention is made of a foam that simultaneously satisfies the three requirements of a bubble fineness corresponding to 9 bubbles/mm$^2$ or more, flexibility of 0.7 N/cm$^2$ or less in initial Young's modulus indicated by 50% compressive stress, and bulk density of 0.14 g/cm$^3$ or less. The foam provided per the present invention has fine bubbles distributed uniformly, is lightweight and low in density, and offers sufficient elasticity as well as excellent absorbency and barrier property with respect to cosmetic materials. Therefore, the foam is deemed to have the properties most desired by cosmetic applicators.

In addition, the results of a monitor test in which the subjects were asked to use a cosmetic applicator proposed by the present invention to apply (1) powdery foundation and (2) liquid cream foundation produced positive comments, such as "The foam does not feel rough," "Soft on the skin," "Easy to spread the cosmetic material over the skin" and "I don't feel the skin is pulled." The overall scores indicated high utility of the foam. In particular, the unique touch of the molded cosmetic applicator, which comes from the flexibility and lightness of the foam, is not available with other conventional cosmetic applicators. Therefore, the cosmetic applicator proposed by the present invention offers superior product value along with good utility.

DETAILED DESCRIPTION OF THE PREFERRED EMBODIMENT

The present invention uses a general latex formulation used in latex foam production; namely, air and sodium silicofluoride are injected into a stock compound solution of rubber latex, and the mixture is agitated at high speed to achieve complete solidification in around 2 to 3 minutes.

Under the present invention, the stock solution for latex foam production is output to a specified thickness and quickly solidified and vulcanized to produce a foam. A distinctive feature of the present invention is that when the solution is solidified by microwave irradiation, microwave irradiation is started within a specified time.

To be specific, an important part of the present invention is to adjust the time after the stock solution for latex foam production is output and before microwave irradiation is started to 80 seconds or less, or preferably 70 seconds or less, or more preferably 50 seconds or less. If the time before start of irradiation exceeds 70 seconds, finely formed bubbles will break and thus a foam with a fine bubble structure cannot be obtained. Flexibility of the foam will also drop. On the other hand, if the time before start of irradiation is less than 10 seconds, implementing microwave irradiation will become practically difficult due to limitations of the work procedure. The present invention allows for production of an intended foam by adjusting the time before start of microwave irradiation to a range of 10 to 70 seconds, or preferably 10 to 50 seconds.

In the present invention, it is important to use a foaming stock solution that gelates and solidifies completely within 2 to 3 minutes at 29±2° C., in order to achieve quick solidification via a microwave irradiation started within 80 seconds after the solution is output. Although the temperature of the foaming stock solution and that of the work environment are adjusted to 29±2° C., the microwave irradiation temperature must be controlled at 40° C. or below, or preferably between 37 and 40° C. If the microwave irradiation temperature exceeds 40° C., the stock solution will expand and cause the molded product to deform or generate "cavities," thereby resulting in unstable quality.

Although the specific duration varies according to the microwave output, the microwave irradiation time should be around 20 seconds at a frequency of 1.5 kW or 15 seconds at 2 kW. If the microwave irradiation time becomes longer, the stock solution will boil excessively and a non-uniform structure will result. An appropriate microwave irradiation time must be set in order to prevent this problem.

The usable microwave frequencies vary from one country to another. In Japan, the generally used frequency of 2,450 MHz is sufficient.

As for the rubber latex used in the present invention, a latex made from natural rubber or synthetic rubber such as NBR (acrylonitrile butadiene rubber) or SBR (styrene butadiene rubber) is desirable. However, chloroprene rubber and other synthetic rubber latexes can also be used.

The solid content of latex should be 60 percent by weight or more, or preferably 65 percent by weight or more. If the solid content is low, "cavities" will form after molding and the resulting molded foam will have a non-uniform property. Use active sulfur as the vulcanizing agent, along with commonly used vulcanization accelerators such as thiazole, thiourea, thiuran and dithiocarbamate vulcanization accelerators. Antioxidants, antibacterial agents and coloring agents are also blended to prepare the rubber latex compound solution.

Under the present invention, the prepared rubber latex compound solution is agitated at high speed as sodium silicofluoride and air are injected. An oaks mixer or other mixer may be used as the agitation implement. The bubbling factor of the stock solution for latex foam production is adjusted to 1,000 cc per approx. 140 g (bubbling factor of approx. 7).

The present invention also encompasses a method to produce a cosmetic applicator from the aforementioned foam. To produce a cosmetic applicator from a molded foam, the solution solidified under the aforementioned condition is exposed to dry heat to cause vulcanization. The obtained vulcanized foam is sliced, and multiple sliced sheets are simply stacked, or stacked in such a way that the molded surface membrane with crushed bubbles faces the top membrane, and joined together. The joined foam sheets are then stamped into an appropriate shape and undergo the final vulcanization process. If necessary, the foam is adjusted to a cosmetic applicator shape and its periphery is smoothened to produce a cosmetic applicator.

To join the aforementioned foam sheets together and vulcanize to produce a cosmetic applicator, two methods can be employed: (1) Stack solidified and vulcanized foam sheets and join them together, or (2) Stack solidified foam sheets that underwent only primary vulcanization and join them together, and then complete the vulcanization process. In the case of (1), complete vulcanization can be achieved by heating at a wet heat temperature of 100 to 130° C. for 20 to 40 minutes in an autoclave using steam, etc. After the vulcanization, the foam is sliced and an appropriate number of sheets are stacked and joined together to obtain a cosmetic applicator of an appropriate shape. In the case of (2), primary vulcanization is performed at a dry heat temperature of approx. 110° C. for approx. 60 minutes. Again, the obtained foam is sliced and an appropriate number of sheets are joined together, shaped into an applicator form, and then subjected to secondary vulcanization at a wet heat temperature of 100 to 130° C. for 20 to 40 minutes. Method (2) provides a smoother foam surface.

When stacking and joining together multiple sliced foam sheets, use of adhesive will add so-called "body" to the center of the foam. The adhesive layer will also function as a barrier to prevent the cosmetic material from permeating into the foam. Also, by joining foam sheets together in such a way that the molded surface membrane faces the top membrane, a cosmetic applicator offering superior absorbency and barrier property with respect to cosmetic materials, as well as excellent utility, can be obtained.

Appropriate adhesives include rubber emulsion, polyurethane emulsion and acrylic adhesives.

The present invention is explained in details by using examples. Note, however, that the scope of the present invention is not limited to these examples.

In the description of the present invention, fineness of foam was measured using a microscope (digital HD microscope VH-7000), with the number of bubbles counted per unit area and expressed as bubbles per square millimeters. Flexibility was measured as initial Young's modulus indicated by 50% compressive stress in conformance with JIS K 6767. Bulk density was measured in conformance with JIS K 6767.

EXAMPLE 1

A latex compound solution for foaming was prepared based on the formulation shown in Table 1 below:

TABLE 1

| NIPOL LX 531 B | (NBR latex manufactured by Nippon Zeon) | 100 parts |
|---|---|---|
| Trimene Base | (Vulcanization accelerator manufactured by UNIROYAL) | 0.6 part |
| Sulfur | (Vulcanizing agent manufactured by Hosoi Chemical Industry) | 1.3 parts |
| Accel MZ | (Vulcanization accelerator manufactured by Kawaguchi Chemical Industry) | 1.3 parts |
| Antage BHT | (Anti-oxidant manufactured by by Kawaguchi Chemical Industry) | 1.0 part |

(The amount of each ingredient is indicated by an equivalent solid content and expressed as parts by weight.)

One hundred parts of the aforementioned compound solution were agitated in an oaks mixer while injecting 1.5 parts of sodium silicofluoride and air to obtain a stock solution for latex foam production with a bubbling factor of 7.

The obtained stock solution for latex foam production was output into a liner having mold release property and adjusted to a thickness of 23 mm using a squeezee. Microwaves were irradiated 40 seconds after the start of output (microwave frequency: 2,450 MHz).

The latex solidified after 15 seconds of microwave irradiation at a frequency of 2 kW. Next, the latex was placed in an autoclave and vulcanized for 40 minutes at a wet heat temperature of 120° C. to obtain a foam sheet of 16 mm in thickness.

The top and bottom surface membranes of the foam sheet (molded surface and top surface) were sliced by 3 mm each and removed to obtain a foam sheet of 10 mm in thickness.

The obtained sheet was stamped into a circle of 60 mm in diameter and the periphery of the circle was smoothened.

The obtained cosmetic applicator had a fineness corresponding to 11.6 bubbles/mm$^2$, flexibility of 0.41 N/cm$^2$ in initial Young's modulus indicated by 50% compressive stress, and bulk density of 0.120 g/cm$^3$.

As for utility of the cosmetic applicator, the foam had less roughness, was softer on the skin and allowed the cosmetic material to spread better over the skin, and therefore achieved higher satisfaction among the users, compared with a conventional applicator.

EXAMPLE 2

The stock solution for latex foam production based on the same formulation in Example 1 (Table 1) was used.

The stock solution for latex foam production was output into a liner having mold release property to a thickness of 20 mm, and microwaves were irradiated for 15 seconds at a frequency of 2 kW, 10 seconds, 30 seconds, 50 seconds and 70 seconds after the solution was output, respectively.

As comparative examples, microwaves were also irradiated 80 seconds and 100 seconds after the stock solution was output, respectively.

The microwave irradiation time was the same for all examples and comparative examples.

The time from solution output to start of microwave irradiation could not be reduced to less than 10 seconds due to limitations of the work procedure.

The properties of the obtained foams are shown in Table 2.

TABLE 2

|  | Example 2 | | | | Comparative examples | |
|---|---|---|---|---|---|---|
| Time from output to microwave irradiation | 10 sec | 30 sec | 50 sec | 70 sec | 80 sec | 100 sec |
| Fineness by number of bubbles (bubbles/mm$^2$) | 11.7 | 11.5 | 11.3 | 10.5 | 8.2 | 5.5 |
| 50% compressive stress (N/cm$^2$) | 0.41 | 0.48 | 0.53 | 0.60 | 1.00 | 1.54 |
| Bulk density (g/cm$^3$) | 0.12 | 0.13 | 0.12 | 0.11 | 0.15 | 0.17 |

To provide comparative data, the foam obtained by a conventional technology (normal solidification, with solidification completing in 130 seconds) had a bubble fineness corresponding to 4.5 bubbles/mm$^2$, flexibility of 1.70 N/cm$^2$ in initial Young's modulus indicated by 50% compressive stress, and bulk density of 0.18 g/cm$^3$. The cosmetic applicator molded from this foam had a coarse bubble structure, rough touch, high density and excessive body, and its utility was far inferior to the cosmetic applicator obtained by the present invention.

EXAMPLE 3

One hundred parts of the compound solution used in Example 1 were agitated in an oaks mixer while injecting 1.5 parts of sodium silicofluoride and air to obtain a stock solution for latex foam production with a bubbling factor of 7.

The obtained stock solution for latex foam production was output into a liner having mold release property and adjusted to a thickness of 13 mm using a squeezee. Microwaves were irradiated for 15 seconds at a frequency of 2 kW, 40 seconds after the start of pouring. Next, primary vulcanization was performed for 60 minutes at a dry heat temperature of 100° C. to produce a NBR foam sheet of 9 mm in thickness, and the foam was sliced into two at the center. The sliced sheets were placed together with their sliced surfaces facing out (molded surface and top surface facing out), and joined with polyurethane emulsion bridging type adhesive to obtain a joined sheet of 9 mm in thickness.

The joined sheet was formed into a 5-cm circle and exposed to a wet heat temperature of 120° C. for 30 minutes to undergo secondary vulcanization.

The obtained foam had a bubble fineness corresponding to 11.7 bubbles/mm$^2$, flexibility of 0.49 N/cm$^2$ in initial Young's modulus indicated by 50% compressive stress, and bulk density of 0.13 g/cm$^3$.

The comments on the use of the applicator molded from this foam indicated extreme softness, body at the joint in the center, and excellent utility backed by a combination of elasticity and surface flexibility.

EXAMPLE 4

One hundred parts of the compound solution used in Example 1 were prepared by blending 60% of Nipol-LX531B and 40% of Nipol-LX531 instead for the rubber latex portion. One hundred parts of this compound solution were then agitated in an oaks mixer while injecting 1.5 parts of sodium silicofluoride and air to obtain a stock solution for latex foam production with a bubbling factor of 7. The obtained stock solution for latex foam production was output into a belt having mold release property and adjusted to a thickness of 25 mm using a squeezee. Microwaves were irradiated for 12 seconds at a frequency of 2 kW, 30 seconds after the start of output, in order to solidify the solution. Next, vulcanization was performed for 60 minutes at a dry heat temperature of 110° C. to produce a foam sheet of 17 mm in thickness. Then, the top and bottom surfaces of the foam sheet were sliced by 3 mm each and removed to obtain a foam sheet of 10 mm in thickness.

The obtained sheet was stamped into a rectangle of 60 mm×40 mm in size and the periphery of the rectangle was smoothened to obtain a cosmetic applicator. The obtained foam had a fineness corresponding to 11.7 bubbles/mm$^2$, flexibility of 0.48 N/cm$^2$ in initial Young's modulus indicated by 50% compressive stress, and bulk density of 0.130 g/cm$^3$.

The obtained cosmetic applicator exhibited an excellent ability to spread and apply the cosmetic material on the skin, thereby providing an applicator that would achieve high satisfaction among the users regarding the quality of makeup.

What is claimed is:

1. A method for producing a cosmetic applicator from a foam, comprising the steps of:

injecting sodium silicofluoride and air into a rubber latex while agitating the mixture at high speed to produce a stock solution for latex foam production, wherein the solution is formulated to be solidified in around two to three minutes at 29±2° C., wherein the sodium silicofluoride is the only gelling agent used in the solution;

outputting the solution into an open-top belt with a closed bottom, and adjusting its thickness using a squeezee, said belt having mold release property;

irradiating the solution with microwaves and continuing the irradiation exclusively for solidifying the solution to obtain a solidified foam, wherein the irradiation starts within 70 seconds of the start of the outputting step, and wherein the solution is kept at 40° C. or less while irradiating the solution with microwaves;

vulcanizing the solidified foam by heat, thereby forming a vulcanized foam which has (i) a bubble fineness corresponding to 9 bubbles/mm$^2$ or more, (ii) a flexibility of 0.7 N/cm$^2$ or less in initial Young's modulus indicated by 50% compressive stress, and (iii) a bulk density of 0.14 g/cm$^3$ or less, wherein the vulcanization step comprises partially vulcanizing the solidified foam, slicing the partially vulcanized foam to produce sheets, stacking the sheets, and further vulcanizing the stacked sheets; and forming a cosmetic applicator using the vulcanized foam.

2. The method as described in claim 1, wherein said foam satisfies a bubble fineness of 9 to 13 bubbles/mm$^2$, flexibility of 0.3 to 0.7 N/cm$^2$ in initial Young's modulus indicated by 50% compressive stress, and bulk density of 0.10 to 0.14 g/cm$^3$.

3. The method as described in claim 1, further comprising slicing the vulcanized foam to produce sheets and stacking the sheets.

4. The method as described in claim 3, wherein the vulcanization is performed by wet heat at 100-130° C. for 20-40 minutes.

5. The method as described in claim 1, wherein the partial vulcanization is performed by dry heat at approximately 110° C. for approximately 60 minutes, and the complete vulcanization is performed by wet heat at 100-130° C. for 20-40 minutes.

6. The method as described in claim 1, wherein the irradiation step starts at 10 to 70 seconds after the start of the outputting step.

7. The method as described in claim 6, wherein the irradiation step starts at 10 to 50 seconds of the start of the outputting step.

8. The method as described in claim 1, wherein the irradiation step continues for 15 to 20 seconds.

9. The method as described in claim 1, wherein the solution has a bubbling factor of approximately 7.

10. The method as described in claim 1, wherein the solution has a solid content of 60% or more by weight.

11. The method as described in claim 1, wherein the microwave irradiation is conducted for approximately 20 seconds at a frequency of 1.5 kW or 15 seconds at a frequency of 2 kW.

12. The method as described in claim 1, wherein the solution is agitated at high speed using an oaks mixer.

13. The method as described in claim 1, wherein the irradiation step follows immediately after the step of adjusting the thickness.

14. A method for producing a cosmetic applicator from a foam, comprising the steps of:

injecting sodium silicofluoride and air into a rubber latex while agitating the mixture at high speed to produce a stock solution for latex foam production, wherein the solution is formulated to be solidified in around two to three minutes at 29±2° C.;

outputting the solution into an open-top liner or belt with a closed bottom, and adjusting its thickness using a squeezee, said liner or belt having mold release property;

immediately following the step of adjusting the thickness, carrying out a step of irradiating the solution with microwaves and continuing the irradiation exclusively for solidifying the solution to obtain a solidified foam, wherein the irradiation starts within 70 seconds of the start of the outputting step;

vulcanizing the solidified foam by heat, thereby forming a vulcanized foam, wherein the vulcanization step comprises partially vulcanizing the solidified foam, slicing the partially vulcanized foam to produce sheets, stacking the sheets, and further vulcanizing the stacked sheets; and forming a cosmetic applicator using the vulcanized foam.

* * * * *